(12) United States Patent
Kataoka

(10) Patent No.: US 7,233,416 B2
(45) Date of Patent: Jun. 19, 2007

(54) COMMUNICATION TERMINAL DEVICE

(75) Inventor: Naoto Kataoka, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 1047 days.

(21) Appl. No.: 10/196,507

(22) Filed: Jul. 15, 2002

(65) Prior Publication Data
US 2003/0016392 A1 Jan. 23, 2003

(30) Foreign Application Priority Data
Jul. 17, 2001 (JP) ............................. 2001-217305

(51) Int. Cl.
H04N 1/00 (2006.01)
(52) U.S. Cl. .................. 358/400; 358/450; 358/1.15; 358/1.12
(58) Field of Classification Search ............ 358/1.18, 358/1.15, 450
See application file for complete search history.

(56) References Cited

U.S. PATENT DOCUMENTS 5,930,006 A * 7/1999 Yoshida et al. ............ 358/450
6,462,832 B1 * 10/2002 Malik ....................... 358/1.15
6,559,967 B1 5/2003 Akiba et al.
6,804,021 B1 * 10/2004 Yoshida .................... 358/1.15
6,985,242 B1 * 1/2006 Toyoda ..................... 358/1.15
2002/0186413 A1 * 12/2002 Ito .......................... 358/1.18

FOREIGN PATENT DOCUMENTS

| JP | 07-264385 | 10/1995 |
| JP | 08-265503 | 10/1996 |
| JP | 11-252326 | 9/1999 |
| JP | 2000-175007 | 6/2000 |
| JP | 2000-184166 | 6/2000 |
| JP | 2001-016425 | 1/2001 |

* cited by examiner

Primary Examiner—Kimberly Williams
Assistant Examiner—Ashish K. Thomas
(74) Attorney, Agent, or Firm—Hogan & Hartson LLP

(57) ABSTRACT

The present invention provides a communication terminal device having a communicating unit communicating with a receiving device to determine attribute format capabilities for transmission and to establish a facsimile communication with the receiving device. The communication terminal device also includes a control unit controlling the transmission of information in the determined attribute format to be output by the receiving device in the determined attribute format. The attribute format for transmission is selected from the group consisting of Nin1 format transmission, where N is any positive integer and booklet format transmission.

16 Claims, 10 Drawing Sheets

COMMUNICATION TERMINAL DEVICE

CROSS REFERENCE TO RELATED APPLICATIONS

The present application claims priority of Japanese Patent Application No. 2001-217305 filed Jul. 17, 2001 with Japanese Patent Office and the entire disclosure thereof is incorporated herein by reference.

FIELD OF THE INVENTION

The present invention relates to a communication terminal device which is capable of carrying out a facsimile communication.

DESCRIPTION OF THE RELATED ART

Recently, various functions have been added to copying machines or printers, For example, copying machines and printers are loaded with an Nin1 function (where N is any positive integer) for arranging images of a plurality of consecutive pages and recording onto one sheet of recording paper, and a booklet function for recording images of a plurality of pages onto both sides of the recording paper so that a booklet is made when folding the recorded recording paper into two.

However, these functions are not loaded for a facsimile communication and these functions can not be used. Therefore, when a user wants to carry out an Nin1 transmission or a booklet transmission, for example, the user is required to carry out an Nin1 copy or a booklet copy by the copying machine, and to carry out the facsimile transmission with the copied recording paper as a document. This processing is extremely complicated.

As in the manner stated above, it is considered of abbreviating the operation for recording and output to the recording paper once and then re-reading to be transmitted, reading the image of each page and collecting into Nin1, and transmitting by the facsimile the collected image as it is. In such case, since the image is transmitted after the image is formed so that it can be recorded and output as it is at the other end, for example, when the contracting processing is necessary, the image is contracted and then transmitted. For example, when carrying out 4in1 transmission wherein the image of four pages of A4 size is to be recorded and output on one page of A4 size, the image of A2 size comprising four pages of A4 size is to be contracted into A4 size and then transmitted. According to communication standards, the resolution is fixed to some extent, and as a result, the image quality equal to or higher than a communication image quality cannot be obtained at the receiving side. At the time being, the image of each page is transmitted without being contracted, and when carrying out the contracting processing at the receiving side, there are many cases in which the image can be recorded and output under the image quality equal to or higher than the communication image quality. Therefore, the image can be recorded and output under the high image quality when only the indication of Nin1 is carried out at the transmitting side and the actual image processing of Nin1 is carried out at the receiving side. However, the conventional communication terminal device was not provided with functions for indicating such Nin1, the booklet or the like, and the transmission could be carried out by carrying out the image processing at the transmitting side, or by the user copying, and so forth.

SUMMARY OF THE INVENTION

The present invention provides a communication terminal device having a communicating unit communicating with a receiving device to determine attribute format capabilities for transmission and to establish a facsimile communication with the receiving device. The communication terminal device also includes a control unit controlling the transmission of information in the determined attribute format to be output by the receiving device in the determined attribute format. The attribute format for transmission is selected from the group consisting of Nin1 format transmission, where N is any positive integer and booklet format transmission.

The present invention was made in consideration to the aforementioned circumstance and it is thus an advantage of the present invention to provide a communication terminal device capable of carrying out a facsimile communication by specifying functions such as an Nin1 or a booklet function.

The present invention is characterized in that the communication terminal device of the transmitting side includes a communicating means capable of communicating by a facsimile with the other end, and a control means for judging receiving ability of the other end which is received via the communicating means when an Nin1 transmission is indicated, indicating Nin1 to the other end from the communicating means when the other end is provided with an Nin1 receiving ability, and transmitting the image of each page by the facsimile. Moreover, the communication terminal device of the receiving side comprises a communicating means capable of carrying out the facsimile communication with the other end, a recording means for recording the image onto the recording paper, and a control means for informing the other end of the fact that an Nin1 receiving ability is provided during a communication protocol, and fitting the received N page(s) into one sheet of recording paper to be recorded by the recording means when receiving the indication of Nin1 from the other end.

Moreover, the present invention is characterized in that the communication terminal device of the transmitting side comprises the communicating means capable of carrying out the facsimile communication with the other end, and the control means for judging the receiving ability of the other end received via the communicating means when the booklet transmission is indicated, indicating the booklet to the other end from the communicating means when the other end is provided with the receiving ability of the booklet, and carrying out the facsimile transmission to the image of each page. In addition, the communication terminal device of the receiving side comprises the communicating means capable of carrying out the facsimile communication with the other end, the recording means for recording the image onto the recording paper, and the control means for informing the other end that the booklet receiving ability is provided during the communication protocol, and recording by the recording means so that the booklet is to be formed with the received image of each page when receiving the indication of the booklet.

As in the manner stated above, the receiving ability of Nin1 or the booklet is informed to the transmitting side from the receiving side, and when the other end is provided with the receiving ability of Nin1 or the booklet, the transmitting side indicates the function and transmits the image of each page. Then, the receiving side carries out the editing to the indicated Nin1 or the booklet and records the editing. Accordingly, the function such as Nin1 or the booklet can be indicated after confirming the receiving ability of the receiving side. Moreover, in the case the receiving side is provided with these functions, the image is transmitted by designating the function, and the image is edited at the receiving side. Therefore, for example, when contracting the image during editing, the edit processing can be carried out by maintaining the image quality during the transmission as possible, and the recording by high image quality can be carried out without being restricted by a communication standard or the like.

Further, when transmitting by designating the booklet, four pages which are to be recorded on both sides of the recording paper, are to be a unit, and the booklet indicated transmission and receiving can be carried out per each unit. In the case of the booklet, unless the transmission of about half of the total page number is completed, the image to be recorded onto one sheet of the recording paper is not complete, and as a result, the recording and output cannot be carried out. Therefore, when a communication error occurs at about half of the total page number, there are cases in which the communication becomes wasteful without a single page being recorded or output. By transmitting with the four pages which are to be recorded on both sides of the recording paper as the unit, the number of pages becoming wasteful when the communication error occurs can be suppressed to three pages at maximum.

Moreover, when transmitting by designating these functions, in the case the other end is capable of double side communication, when transmitting the image of each page by the communicating means, the image can be transmitted by the double side procedure.

DETAILED DESCRIPTION OF THE PREFERRED EMBODIMENTS

Figure 1:
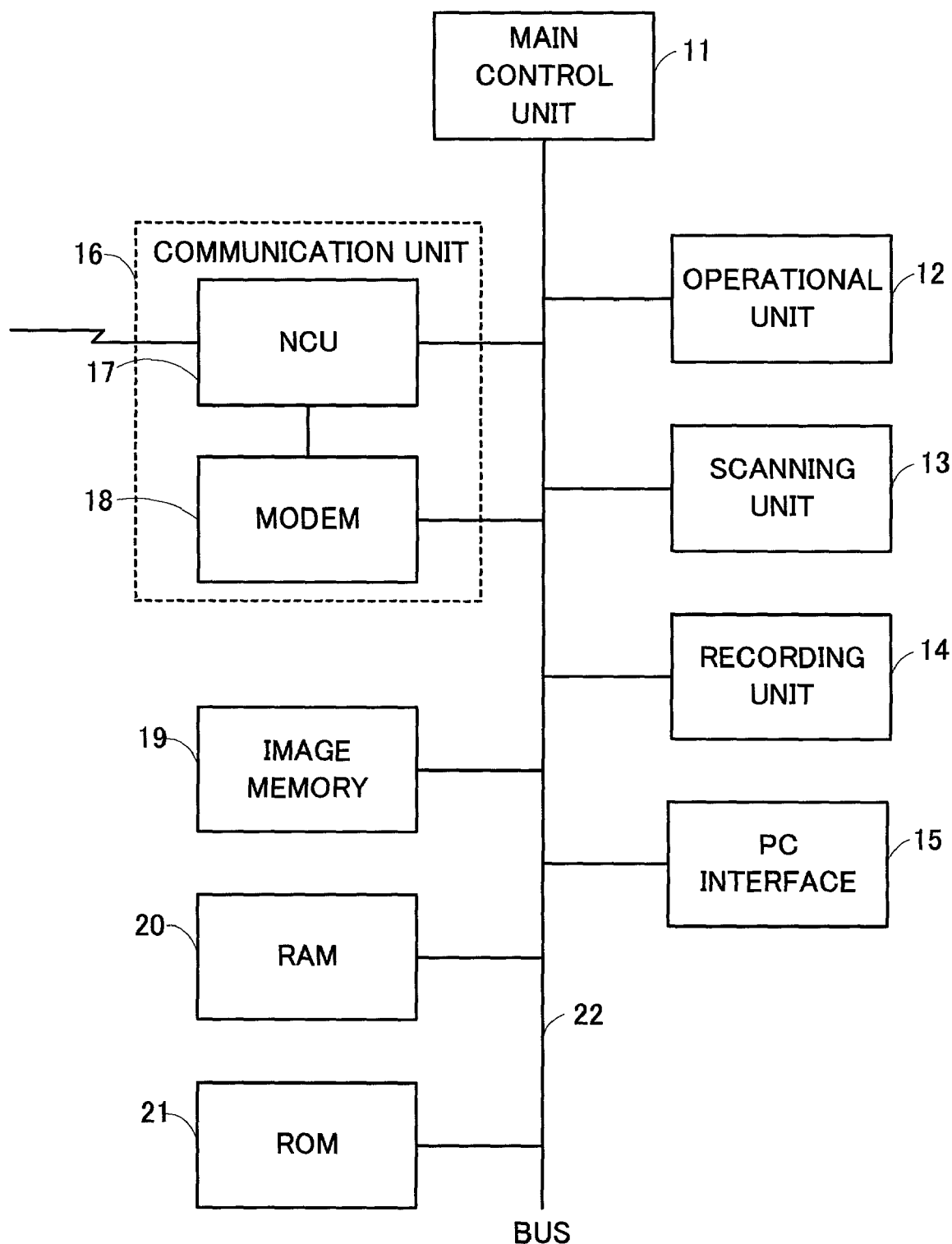
FIG. 1 is a block diagram showing the communication terminal device according to an embodiment of the present invention.

FIG. 1 is a block diagram showing a communication terminal device according to an embodiment of the present invention. In the figure, reference number 11 is a main control unit, 12 is an operational unit, 13 is a scanning unit, 14 is a recording unit, 15 is PC interface, 16 is a communication unit, 17 is NCU (Network Control Unit), 18 is a modem, 19 is an image memory, 20 is RAM (Random Access Memory), 21 is ROM (Read Only Memory) and 22 is a bus.

The main control unit 11 controls the entire communication terminal device, and carries out a facsimile transmission operation and a facsimile receiving operation of an image. Moreover, for example, the main control unit 11 can carry out an operation as a scanner or an operation as a printer. In the facsimile transmission operation, the main control unit 11 can carry out the facsimile transmission of the image scanned by the scanning unit 13 or the image received via the PC interface 15. In the case the designation of an Nin1 transmission or the booklet transmission are received from the operational unit 12 or the PC interface 15, the receiving ability of the other end is judged. Then, when it is confirmed that the other end has the receiving ability of an Nin1 or the booklet, an Nin1 or the booklet is indicated to the other end and the communication unit 16 carries out the facsimile transmission of the image of the each page. When judging the receiving ability of the other end, it can be judged from the information of the receiving ability received from the other end during the communication protocol, and for example, the receiving ability notified from the other end can be judged based on a DIS (Digital Identification Signal), a NSF (Nonstandard Facilities) signal or the like. When using these functions, an Nin1 transmission or the booklet transmission can be indicated by a DTC (Digital Transmit Command) signal, a NSC (Nonstandard Facilities Command) signal or the like.

Further, when carrying out the booklet transmission, in case of recording the image by the other end of the receiving side, with four pages which are to be recorded on both sides of the recording paper as the unit, the two sheets composing transmission can be carried out wherein the image is transmitted as the booklet per each unit. Accordingly, even when the communication error occurs, the number of pages which are not delivered, can be suppressed at minimum. Further, when carrying out the facsimile transmission by using these functions, if the other end is capable of double side communication, the image of each page can be transmitted by the double side procedure. Since the page number or the like can be indicated when it is the double side procedure, for example, in the case of the booklet transmission or the like, by changing the page order to be transmitted and transmitting by giving priority to the page to be recorded on one sheet of the recording paper, the number of pages not delivered when the communication error occurs can be reduced.

Moreover, in the facsimile receiving operation, the receiving ability such as Nin1 or the booklet is informed to the other end of the transmitting side during the communication protocol. For example, these receiving functions can be informed by a DIS signal, a NSF signal or the like. When an Nin1 transmission or the booklet transmission is indicated by a DTC signal, a NSC signal or the like from the other end, such fact is stored. Then, at the time when the receiving of the image of all pages are complete, or when the image of the pages to be recorded on one sheet of the recording paper is complete, the recording unit 14 records the image onto one sheet of the recording paper. At the time being, the image processing corresponding to the function such as Nin1 or the booklet is applied to the received image of each page and then the image is recorded by the recording unit 14. For example, even in the case of contracting the image composed by Nin1 in accordance with the paper size, comparing to the facsimile transmission when contracting the image at the transmitting side, the image contracted under high image quality can be recorded and output by the recording unit 14.

Other than Nin1 or the booklet, for example, the main control unit 11 is capable of carrying out a double side communication or the like, wherein informing various receiving ability to the other end and carrying out the indicated function. Further, even when informing the receiving ability of Nin1, the booklet or the like, the main control unit 11 does not carry out these functions unless there is the indication from the other end. Moreover, it can be set in advance or by following the indication or the like from the other end or the outside computer, the received image can be forwarded to the outside computer via the PC interface 15.

The operational unit 12 is formed of a displaying means, an inputting means or the like, and the displaying device is capable of displaying various information, such as a message to the user, a condition of the device, or the operational guidance. Moreover, the user can carry out various setting or indication by the inputting means. For example, the user can indicate an Nin1 transmission, the booklet transmission, or the like during the facsimile transmission from the inputting means.

Following the control of the main control unit 11, the scanning unit 13 scans the image on the document during the transmitting operation, the copying operation, the scanner operation or the like. Various methods can be adopted for the scanning method.

Following the control of the main control unit 11, the recording unit 14 records onto the recording paper the image received by the communication unit 16 during the receiving operation, the image scanned by the scanning unit 13 during the copying operation, the information received via the PC interface 15 during the printer operation, various setting information or management information, a message for the user and so forth. For the recording method, various methods can be adopted, for example, an electrophotographic method, a thermal method, a thermal transfer method, an inkjet method or the like. Moreover, it is not to be limited to these recording methods. In this example, it is assumed that the recording unit 14 has the function of double side recording. For example, following the control of the main control unit 11, when receiving the booklet, the image per a plurality of pages can be recorded onto both the front side and the back side of the recording paper.

The PC interface 15 is the interface for connecting to the outside computer or the like. For example, during the scanner operation, the image scanned by the scanning unit 13 is forwarded to the outside computer from the PC interface 15. Moreover, during the printer operation, the image being transmitted from the outside computer is received via the PC interface 15, and the information can be recorded and output by the recording unit 14. Moreover, the PC interface 15 can be used when forwarding the image received by the receiving operation to the outside computer, or when transmitting by the transmitting operation the image being transmitted from the outside computer. Further, the standard of the interface is optional and various serial, parallel interfaces can be used. Moreover, the PC interface 15 can be of the structure to be connected to the outside computer via the LAN by LAN interface.

The communication unit 16 carries out the communication with the apparatus of the other end via a public switched network, a leased line or the like. The NCU 17 carries out the control of the network or the like. Moreover, the modem 18 modulates and demodulates the data of the image or the like to be transmitted and received.

The image memory 19 stores the image to be transmitted or the received image, the image scanned by the scanning unit 13, the information to be forwarded via the PC interface 15 or the received information, the image during other processing, and so forth. When storing the image, the image can be stored as it is or to store more images, the image can be encoded and the stored.

The RAM 20 is used when saving of the data is necessary during the processing of the main control unit 11 or other parts. The ROM 21 stores a program defining the operation of the main control unit 11, the fixed data, and so forth.

The bus 22 connects the main control unit 11, the operational unit 12, the scanning unit 13, the recording unit 14, the PC interface 15, the communication unit 16 (the NCU 17, the modem 18), the image memory 19, the RAM 20, the ROM 21, or the like reciprocally, and allows the data forwarding between these parts. Apart from these, various apparatus, such as an outside storing device, can be connected to the bus 22.

Figure 2:
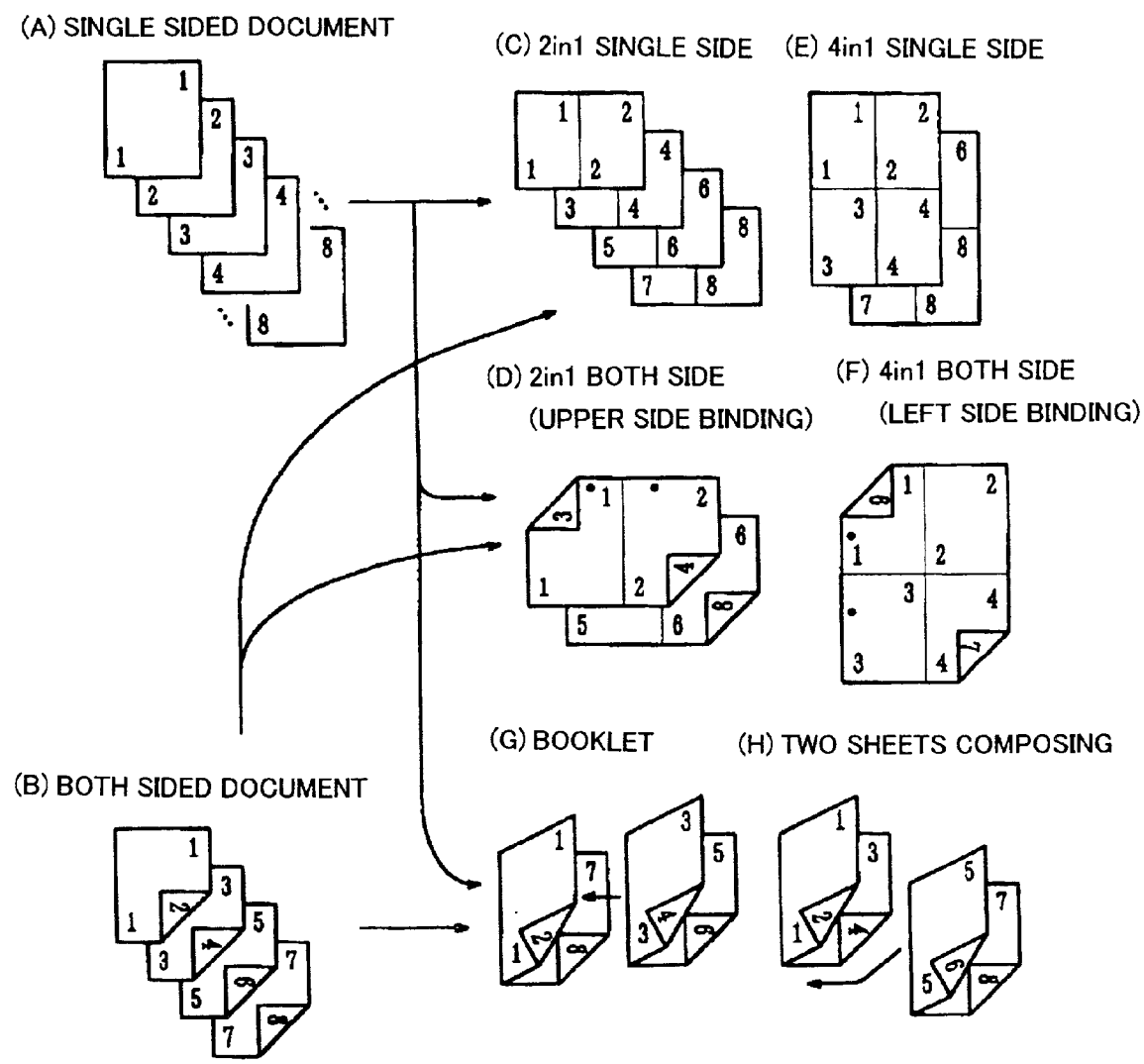
FIG. 2 is a view useful for explaining a specific example of an Nin1 transmission and the booklet transmission.

Next, an example of the operation by the communication terminal device according to an embodiment of the present invention will be described. FIG. 2 is a view useful for explaining a specific example of an Nin1 transmission and the booklet transmission. Before explaining the operation, an Nin1 transmission and the booklet transmission will be explained briefly by using a specific example. FIG. 2 shows a case in which the image of eight pages is to be transmitted. For the documents to be transmitted, there are single sided document as shown in FIG. 2(A), and double-sided document as shown in FIG. 2(B). In the case of the double-sided document, double side scanning can be carried out by the scanning unit 13, or after the image on one of the sides of the document is scanned, the user can re-set the document for the image on the other side to be scanned.

The image scanned from the single sided document or the image scanned from the double-sided document in the manner stated above, can be recorded and output at the receiving side in the manner to be explained below according to the setting. First, in the case of an Nin1 transmission, when N=2, in other words, when it is 2in1 transmission, to carry out the single side recording, as shown in FIG. 2(C), the first and the second pages are to be recorded onto one sheet of recording paper, and in the same manner, the third and the fourth pages, the fifth and the sixth pages, and the seventh and the eighth pages are to be recorded onto one sheet of recording paper. In the drawing, a case of left side binding is shown, however, when biding on the right side, the pages to be recorded on the left and the right, are to be reversed. When carrying out the double-sided recording, as shown in FIG. 2(D), the first and the second pages are to be recorded on one side of one sheet of recording paper, and the third and the fourth pages are to be recorded on the other side of the recording paper. As in the same manner, the fifth and the sixth pages are to be recorded on one side of one sheet of recording paper, and the seventh and the eighth pages are to be recorded on the other side of the same recording paper. Further, in FIG. 2(D), an example of the upper side binding is shown wherein the binding position is shown with "◯", and for example, when binding on the left side, the image of two pages on the back side are to be recorded by rotating 180 degrees.

In the case N=4, in other words, in the case of 4in1 transmission, when carrying out single sided recording, as shown in FIG. 2(E), the first, the second, the third and the fourth pages are to be recorded on one sheet of recording paper and in the same manner, the fifth, the sixth, the seventh, and the eighth pages are to be recorded on one sheet of recording paper. Moreover, when carrying out the double-sided recording, as shown in FIG. 2(F), the first, the second, the third and the fourth pages are to be recorded on one side of one sheet of recording paper and, the fifth, the sixth, the seventh, and the eighth pages are to be recorded on the other side of the same recording paper. FIG. 2(F) shows an example of left side binding, wherein the binding position is shown with "○". Moreover, according to the binding position, for example, when binding at the upper side, the image of four pages on the back side can be rotated 180 degrees.

Furthermore, in the case of the booklet transmission, as shown in FIG. 2(G), the first and the eighth pages are to be recorded on one side of one sheet of recording paper, and the second and the seventh pages are to be recorded on other side of the same recording paper. As in the same manner, the third and the sixth pages are to be recorded on one side of one sheet of recording paper, and the fourth and the fifth pages are to be recorded on other side of the same recording paper. Accordingly, as shown in the drawing, by laying the recording paper one on top of the other and folding at the center, the booklet can be formed.

According to the embodiment of the present invention, as the transformation of the booklet transmission, two sheets composing transmission can be carried out. In the two sheets composing transmission, all pages are divided per four pages and it is to be recorded and output as the booklet per four pages. In other words, as shown in FIG. 2(H), the first and the fourth pages are to be recorded onto one side of one sheet of recording paper, and the second and the third pages are to be recorded on the other side of the same recording paper. In the same manner, the fifth and the eighth pages are to be recorded on one side of one sheet of recording paper, and the sixth and the seventh pages are to be recorded on the other side of the same recording paper. Accordingly, as shown in the drawings, by folding the recording papers and laying one on top of the other, it can be handled in the same manner as the booklet. In the general booklet transmission described above, since the recording to even one sheet of the recording paper cannot be carried out normally at the receiving side unless at least the transmission of the image of the sixth page completes normally, for example, when the communication error occurs during the transmission of the sixth page, the image of five pages which were transmitted by then becomes wasteful. However, in the two sheets composing transmission, since the image of four pages can be recorded onto the first sheet of the recording paper if the image is transmitted normally, the number of pages becoming wasteful when the communication error occurs can be suppressed at three pages at maximum.

In the case of an Nin1 transmission or the booklet transmission in the manner stated above, it is necessary to record the image of a plurality of pages by collecting the image to one side of the recording paper. Moreover, for example, as in 2in1 or the booklet, in the case of recording the image of two pages on one side of the recording paper, when the size of the recording paper to be recorded is smaller than twice the size of the document, a contracting processing or the like also becomes necessary. In 4in1 transmission, when the size of the recording paper to be recorded is smaller than four times the size of the document, same processing also becomes necessary. According to the embodiment of the present invention, it is judged whether or not the communication terminal device of the receiving side is provided with the receiving function of Nin1 or the booklet. When the communication terminal device of the receiving side is provided with the function, various processing is carried out at the receiving side for collecting the images. When the receiving side is not provided with the receiving function of Nin1 or the booklet, various processing for collecting the images is carried out at the transmitting side and then the image is transmitted so that the images are to be output in the manner shown in FIG. 2 at the receiving side.

Figure 3:
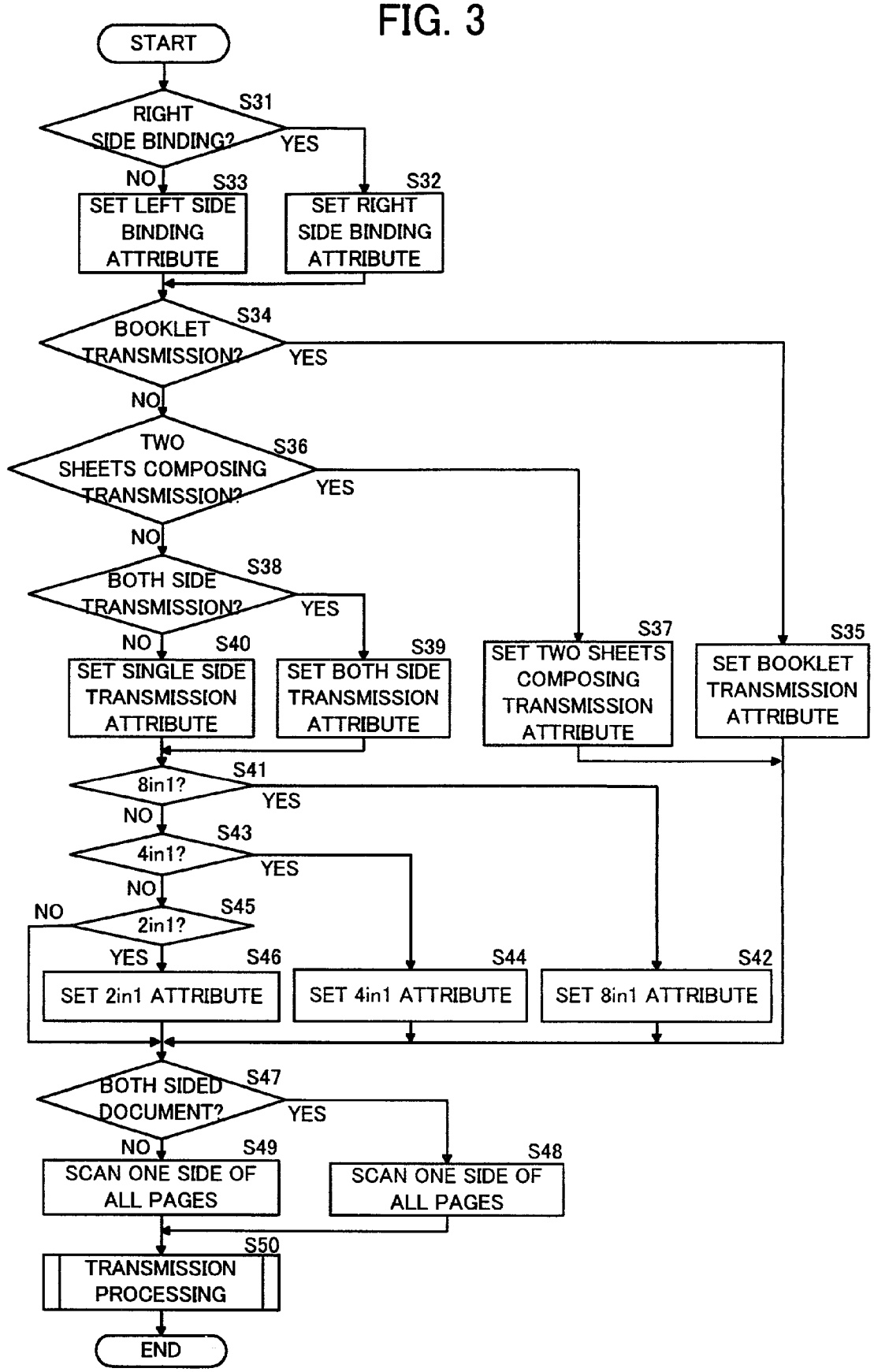
FIG. 3 is a flow chart showing an example of the operation when transmitting by the communication terminal device according to an embodiment of the present invention.

FIG. 3 is a flow chart showing an example of the operation when transmitting by the communication terminal device according to the embodiment of the present invention. First, various settings are carried out. The following various settings are to be made, for example, when indicated from the operational unit 12, or when indicated by receiving the transmission indication from the outside computer via the PC interface 15. Based on these indications, various transmitting attributes are set.

First, the setting of the binding position is made. In S31, it is judged whether or not it is the indication for the right side binding. In the case the right side binding is designated, in S32, the right side binding attribute is set, and in other cases, in S33, the left side binding attribute is set. Further, apart from these, the upper side attribute or the like can be set. Moreover, the setting of the binding position is not required to be carried out.

Next, the setting of the transmission attribute is made. First in S34, it is judged whether or not the booklet transmission is indicated. When the booklet transmission is indicated, in S35, the booklet transmission attribute is set. When the booklet transmission is not indicated, further in S36, it is judged whether or not two sheets composing transmission is indicated, and when the two sheets composing transmission is indicated, in S37, the two sheets composing transmission attribute is set. Further, either judgment in S34 and S36 can be carried out first. When the booklet transmission attribute or two sheets composing transmission attribute is set, the setting of the transmission attribute is to be completed and it proceeds to S47.

When the booklet transmission or the two sheets composing transmission is not indicated, in S38, it is judged whether or not the double side transmission is indicated. When the double side transmission is indicated, in S39, the double side transmission attribute is set, and when the double side transmission is not indicated, in S40, the single side transmission attribute is to be set.

After setting the double side transmission attribute or the single side transmission attribute, the setting of Nin1 is to be made. As an example, it is assumed of a case of N=2, 4, 8. It is judged whether or not 8in1 is designated in S41, and when 8in1 is designated, in S42, 8in1 attribute is set. Moreover, it is judged whether or not 4in1 is designated in S43, and when 4in1 is designated, in S44, 4in1 attribute is set. In addition, it is judged whether or not 2in1 is designated in S45, and when 2in1 is designated, in S46, 2in1 attribute is set. When these are not designated, an Nin1 attribute is not to be set.

The attribute of the booklet transmission, the attribute of the double side transmission, and the attribute of Nin1 are set in the manner stated above. Further, for example, various settings can be carried out by following the indication each time the user carries out the indication from the operational unit 12, or when the start is indicated after all indications are finished, by following the final indication. Moreover, along with aforementioned various indications, the indication of the telephone number of the destination, or the indication of the transmitting image quality, the transmitting density or the like can be made.

When such various settings are completed, in S47, it is judged whether or not the double side scanning is designated, and when the double side scanning is designated, in S48, both sides of the document are scanned by the scanning unit 13, and the image is scanned. The scanning method is optional, and when the scanning unit 13 is provided with the double side scanning mechanism, the image of both sides of the document is scanned automatically, and when it is the structure capable of reading only one side, after the image of one of the sides is scanned, the user re-sets the document so that the image on the other side is to be scanned. When the single side scanning is designated, in S49, only one of the sides of all the documents is scanned and the image is scanned. Further, the scanned image can be accumulated once in the image memory 19 or the like.

When the scanning is completed, in S50, following various attributes set in the manner stated above, a processing is carried out to transmit the scanned image. The transmission processing will be described in reference to FIG. 4 and FIG. 5.

Figure 4:
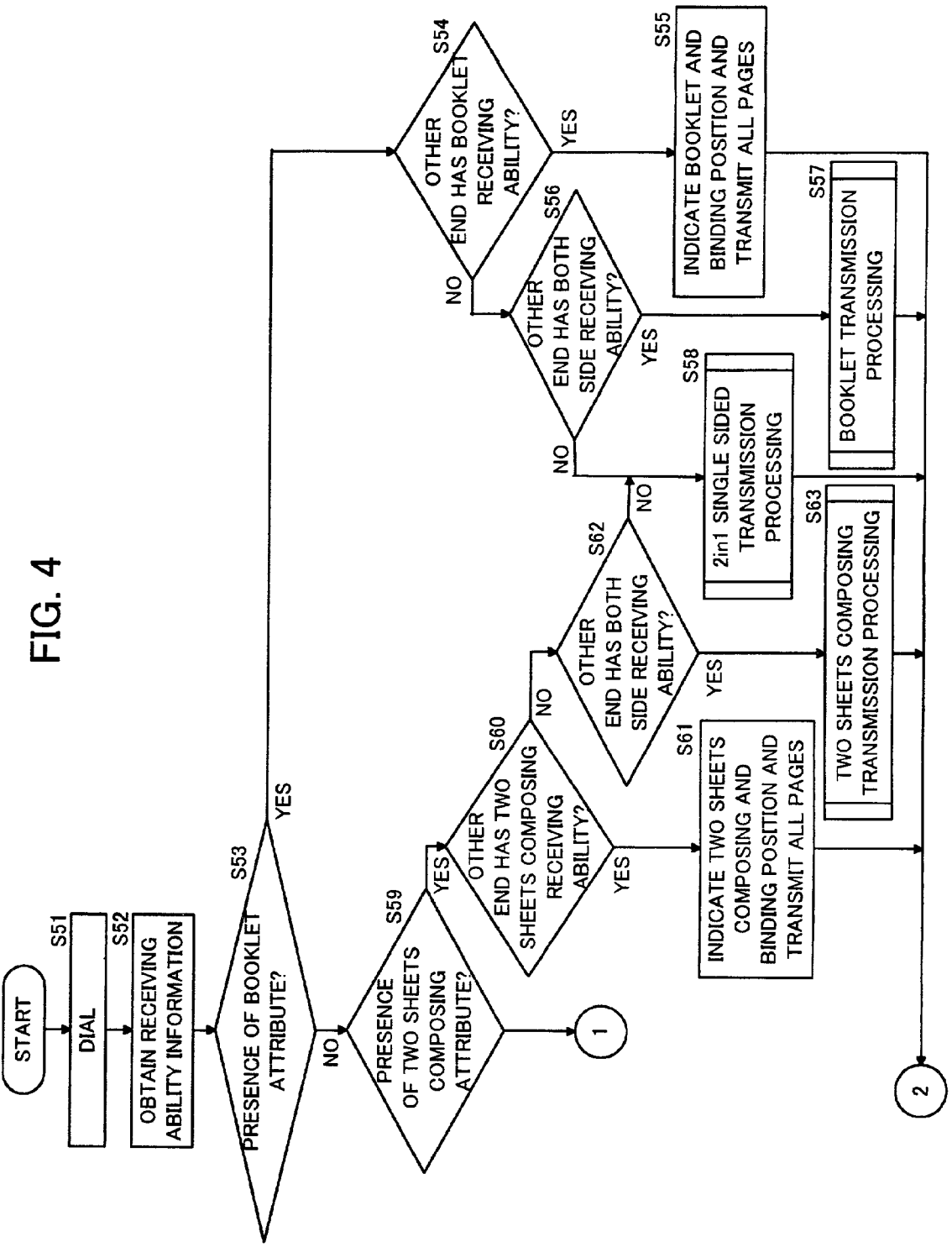
FIG. 4 is a flow chart showing an example of the transmission processing.
Figure 5:
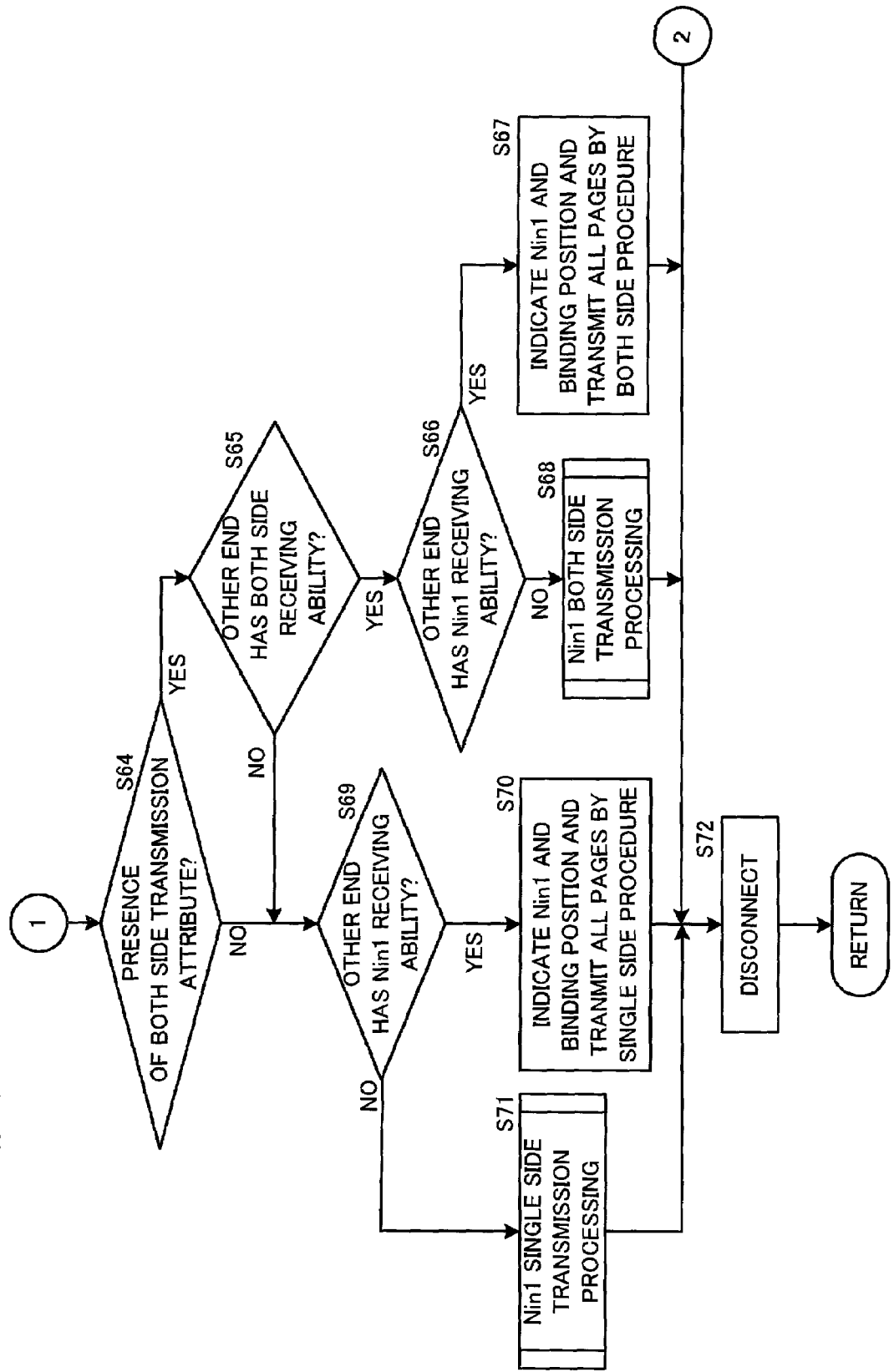
FIG. 5 is a flow chart showing an example of the transmission processing (continuation of FIG. 4).

FIG. 4 and FIG. 5 are flow charts showing an example of the transmission processing. In S51, the NCU 17 of the communication unit 16 dials by the automatic dial function and the network with the other end is connected. Then, following the facsimile communication procedure, the procedure signals are exchanged with the other end. In the process, the information concerning the receiving ability being transmitted from the other end is obtained in S52. For example, the information can be obtained by a DIS signal, a NSF signal or the like. Then, following the attribute set in the processing shown in FIG. 3 and the receiving ability of the other end obtained in S52, the transmission processing corresponding to each of the functions is to be carried out.

In S53, it is judged whether or not the booklet attribute is set, and when the booklet attribute is set, further in S54, it is judged whether or not the other end has the booklet receiving ability: When the other end has the booklet receiving ability, in S55, following the facsimile communication procedure, the receiving of the booklet is indicated to the other end, and the image of all pages are transmitted. The indication of the booklet receiving to the other end can be carried out for example, by DCS signal (Digital Command Signal), NSS (Nonstandard Facilities Setup) signal or the like. Moreover, the image of all pages can be transmitted by the single side procedure, or in the case the other end is provided with double side receiving function, by the double side procedure. When transmitting, the image processing to the booklet is not carried out to the image of each page.

When the other end is not provided with the booklet receiving ability, the booklet is not formed at the other end just by transmitting as it is. Therefore, in S56, it is judged whether or not the other end is provided with the double side receiving ability and when the other end is provided with the double side receiving function, in S57, the image processing is carried out so that the booklet is to be formed at the transmitting side and then the image is transmitted by the double side procedure. In other words, 2in1 image of the page structure as shown in FIG. 2(G) is formed at the transmitting side, and the image of two pages are double side transmitted as the image of one page. Accordingly, even in the case the other end is not provided with the booklet receiving ability, just by carrying out the normal double side recording, the other end is capable of recording and output the booklet. The detail of the processing will be explained later on.

When the other end is not provided with the double side receiving ability, the recording and output of the booklet cannot be carried out at the other end. For example, as in the example shown in FIG. 2(G), even when transmitting 2in1 image by arranging the first and the eighth pages, and the second and the seventh pages next to one another respectively, in the case the single side recording is carried out, the recording paper arranged with the first page and the eighth page, and other recording paper arranged with the second page and the seventh page are to be discharged. This would be difficult to be referred. Therefore, it is assumed that the recording and output as the booklet by the other end is renounced, and in S58, the single side transmission by 2in1 is carried out. Further, in such case, it is desirable to notify the user by displaying on the operational unit 12 with the fact that 2in1 single side transmission was carried out due to the failure of the booklet transmission.

Moreover, in S58, other than 2in1, any transmission method can be used, for example, carrying out 4in1 single side transmission wherein when folding the recording paper into half, the booklet is formed, or carrying out the normal single side transmission for all recording papers. In addition, it can be of the structure to enable the setting in advance of the responding method for the case the set transmission cannot be carried out.

As in the same manner, in S59, it is judged whether or not the attribute for carrying out two sheets composing transmission is set which is a transformation of the booklet transmission. When the two sheets composing attribute is set, further in S60, it is judged whether or not the other end is provided with the two sheets composing receiving ability. When the other end is provided with the two sheets composing receiving ability, in S61, following the facsimile communication procedure, the two sheets composing receiving is indicated to the other end, and the image of all pages are transmitted. The indication of the two sheets composing receiving to the other end can be carried out by DCS signal, NSS signal, or the like. Moreover, the transmission of the image of all pages can be carried out by the single side procedure, or when the other end is provided with the double side receiving function, by the double side procedure. In such case, with four pages as a unit, the image can be transmitted so that the images of the four pages are not separated. For example, even when transmitting by the continuous mode of the double side procedure, it is desirable to be transmitted by the unit of four pages. Otherwise, the advantage of the two sheets composing transmission becomes weak, i.e. the effect in reducing the wasteful part in the communication when the communication error occurs. Further, when transmitting the image of each page, the processing of two sheets composing is not required to be carried out to the image of each page.

In the case the other end is not provided with the two sheets composing receiving ability, when the image is transmitted as it is, the booklet is not formed per each recording paper at the other end. Therefore, in S62, it is judged whether or not the other end is provided with the double side receiving ability, and when the other end is provided with the double side receiving ability, in S63, the image processing is carried out at the transmitting side so that it is to be the same page composition as in the two sheets composing transmission, and then the image is transmitted under the double side procedure. In other words, 2in1 image of the page composition as shown in FIG. 2(H) is formed at the transmitting side and the image of two pages are to be made as the image of one page and the double side transmission is carried out. Accordingly, even when the other end is not provided with the two sheets composing receiving ability, just by carrying out the normal double side recording, the other end is capable of carrying out the recording and output in the same manner as in the two sheets composing transmission.

When the other end is not provided with the double side receiving ability, the recording and the output in the same manner as the two sheets composing transmission cannot be carried out at the other end. For example, as shown in the example illustrated in FIG. 2(H), even when transmitting 2in1 image by arranging the first and the fourth pages, and the second and the third pages next to one another respectively, if the single side recording is carried out, the recording paper with the second and the third pages arranged has no specific problem, however, the recording paper arranged with the second and the third page next to one another becomes difficult to be referred. Therefore, it is assumed that the recording and output is refrained in the same manner as the two sheets composing transmission at the other end, and in S58, the single side transmission is carried out by 2in1. Further, in such case, for example, the user can be notified from the displaying on the operational unit 12 that the 2in1 single side transmission was carried out due to the failure of the two sheets composing transmission. Moreover, for the same reason as the case of the booklet transmission, other transmission methods can be applied in S58.

When the booklet attribute or the two sheets composing attribute is not set, in S64, it is judged whether or not the double side transmission attribute is set. When the double side transmission attribute is set, further in S65, it is judged whether or not the other end is provided with the double side receiving ability. When the other end is provided with the double side receiving ability, further in S66, it is judged whether or not the other end is provided with an Nin1 receiving ability, and when the other end is provided with an Nin1 receiving ability, in S67, an Nin1-double side receiving is indicated to the other and the image of all pages are transmitted. When the other end is not provided with an Nin1 receiving ability, in S68, an Nin1-double side transmission processing is carried out for transmitting by carrying out an Nin1 composing processing at the transmitting side. Further, for the normal double side transmission, it is to be carried out in S68.

Moreover, when the double side transmission attribute is not set in S64, or when it is judged that the other end is not provided with the double side receiving ability in S65, further in S69, it is judged whether or not the other end is provided with an Nin1 receiving ability. When the other end is provided with an Nin1 receiving ability, in S70, an Nin1 single side receiving is indicated to the other end and the image of all pages is transmitted. When the other end is not provided with an Nin1 receiving ability, in S71, an Nin1 single side transmission processing is carried out for transmitting by carrying out an Nin1 composing processing at the transmitting side. Further, for the normal single side transmission, it is to be carried out in S71.

When each of the respective transmission processing is completed, in S72, the network is disconnected, and the communication is completed. As in the manner stated above, in the embodiment of the present invention, the transmission can be carried out by considering the receiving ability of the other end of the receiving side, along with the attribute set at the transmitting side. As a result, for example, for the function provided with the receiving ability by the other end, the image processing is to be carried out by the other end. Accordingly, the processing amount at the transmitting side can be reduced and by carrying out the image processing at the other end, the image can be recorded and output under even higher image quality.

Figure 6:
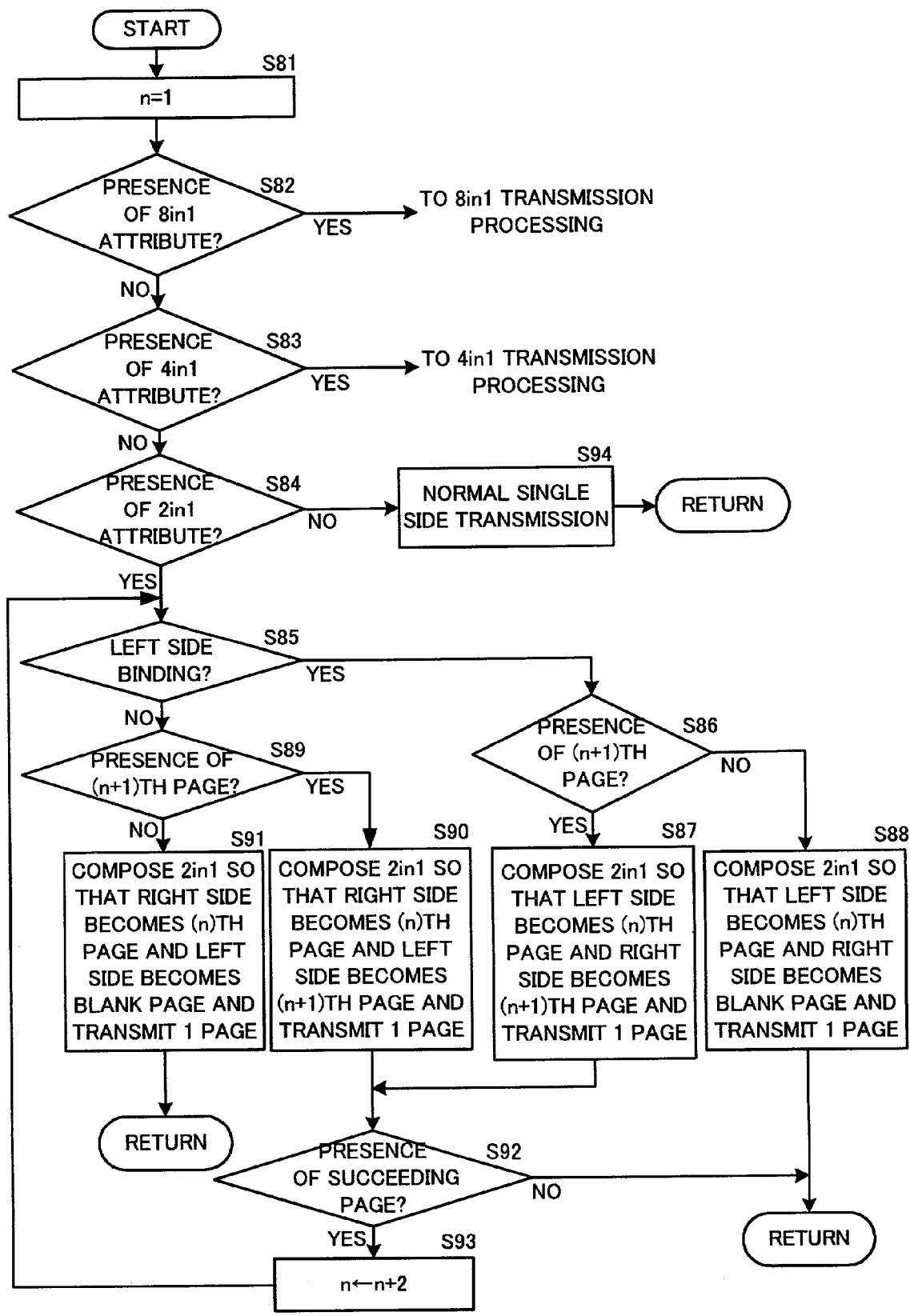
FIG. 6 is a flow chart showing an example of an Nin1 single side transmission processing.

Several transmission processing shown in FIG. 4 and FIG. 5 will now be described in a detail. FIG. 6 is a flow chart showing an example of an Nin1 single side transmission processing. The processing shown in FIG. 6 is the processing carried out in S71 shown in FIG. 5. First in S81, a variable (n) showing the page number of the document is to be initialized to 1. In S82, it is judged whether or not 8in1 attribute is set. In S83, it is judged whether or not 4in1 attribute is set. In S84, it is judged whether or not 2in1 attribute is set. When any one of these attributes is not set, in S94, the normal single side transmission is carried out.

When either one of the attributes is set, a corresponding processing is carried out. As an example, the processing of when 2in1 attribute is set is shown after S85. In the case of 4in1 or 8in1, the number of pages to be composed just becomes four pages or eight pages and since the basic processing is similar to 2in1, the description will be abbreviated.

In S85, it is judged whether or not the left side binding attribute is set. When the left side binding attribute is set, in S86, it is judged of the presence of the image of the (n+1)th page. When the image of the (n+1)th page is present, in S87, 2in1 composition is made so that the (n)th page is to be on the left side, and the (n+1)th page is to be on the right side, and the composed image is transmitted as the image of one page. Then, it proceeds to S92, and it is judged whether or not the succeeding page is present in S92, and when the succeeding page is present, in S93, 2 is added to the variable (n) which shows the page number, and it returns to S85. When the succeeding page is not present in S92, an Nin1 single side transmission processing is completed. Moreover, when the image of the (n+1)th page is not present in S86, in S88, 2in1 composition is made so that the (n)th page is to be on the left side and the right side is to be a blank paper, and the composed image is transmitted as the image of one page and the Nin1 single side transmission processing is completed.

As in the same manner, when it is judged that right side binding attribute is set in S85, in S89, it is judged of the presence of the image of the (n+1)th page, and when the image of the (n+1)th page is present, in S90, 2in1 composition is made so that the (n)th page is to be on the right side and the (n+1)th page is to on the left side, and the composed image is transmitted as the image of one page. Then, it proceeds to S92, and it is judged whether or not the succeeding page is present in S92, and when the succeeding page is present, in S93, 2 is added to the variable (n) showing the page and it returns to S85. When the succeeding page is not present in S92, an Nin1 single side transmission processing is completed. Moreover, when the image of the (n+1)th page is not present in S89, in S91, 2in1 composition is made so that the (n)th page is to be on the right side, and the left side is to be a blank page. Then, the composed image is transmitted as the image of one page and an Nin1 single side transmission processing is completed.

In the example shown in FIG. 6, an Nin1 single side transmission processing is shown, however, by transmitting the composed image reciprocally as the front side image and the back side image, an Nin1-double side transmission processing can be carried out in S68 shown in FIG. 5. Further, 2in1 single side transmission processing to be carried out in S58 shown in FIG. 4 can be realized by the processing of S81 or S85 through S93 shown in FIG. 6.

Figure 7:
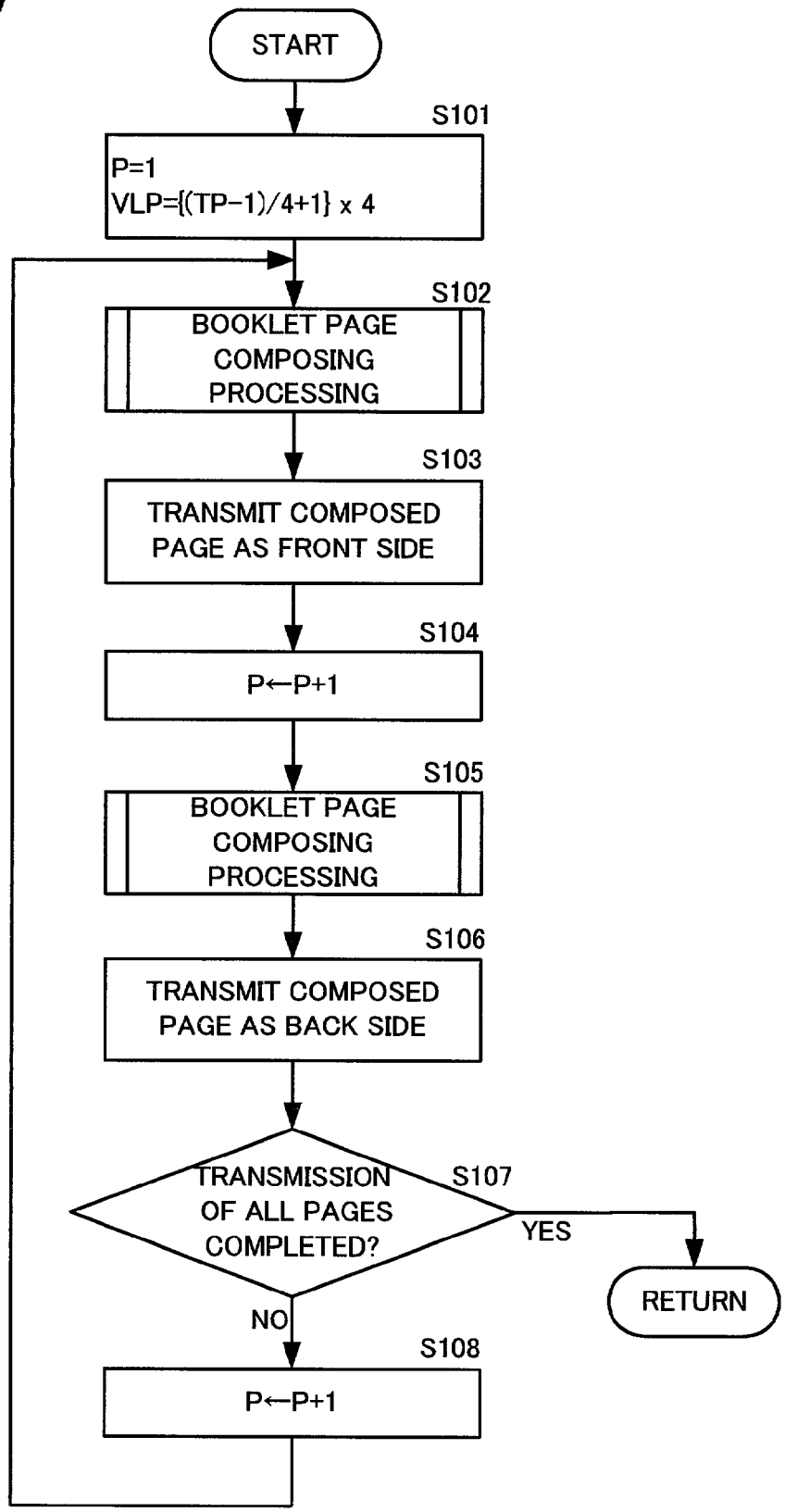
FIG. 7 is a flow chart showing an example of the booklet transmission processing.

FIG. 7 is a flow chart showing an example of the booklet transmission processing. The processing shown in FIG. 7 is the processing carried out in S57 shown in FIG. 4. First in S101, a variable P showing the transmitting page is initialized to 1. In addition, a variable VLP showing the virtual last page is calculated. The virtual last page shows the page next to the first page. Since the image of four pages forms the image of both sides of one sheet of the recording paper, according to the number of pages to be transmitted, there is a possibility that three blank pages are to generate at maximum. Therefore, the virtual last page is not necessarily to be corresponding to the last page to be transmitted. In S101, the virtual last page is calculated, including such blank page. When the total number of pages to be transmitted is TP, the virtual last page can be figured out by dividing (TP−1) by 4, adding 1 to the whole number of the former and then multiplying by 4.

In S102, a booklet page composing processing to be explained below is carried out, and in S103, the composed image is transmitted as the front side image. In S104, 1 is added to the variable P and the transmitting page is preceded to the next page and in S105, the booklet page composing processing is carried out again. Then in S106, the composed image is transmitted as the back side image. Accordingly, the images of the front and the back, which are to be recorded onto one sheet of the recording paper, can be transmitted.

In S107, it is judged whether or not the transmission of all pages has been completed. The completion of the transmission of all pages can be judged by the value twice the value of the variable P becoming equal to the variable VLP (the virtual last page). In the case there are still pages yet to be transmitted, in S108, 1 is added to the variable P and the processing is continued by returning to S102. When the transmission of all pages is completed, the booklet transmission processing is completed.

Figure 8:
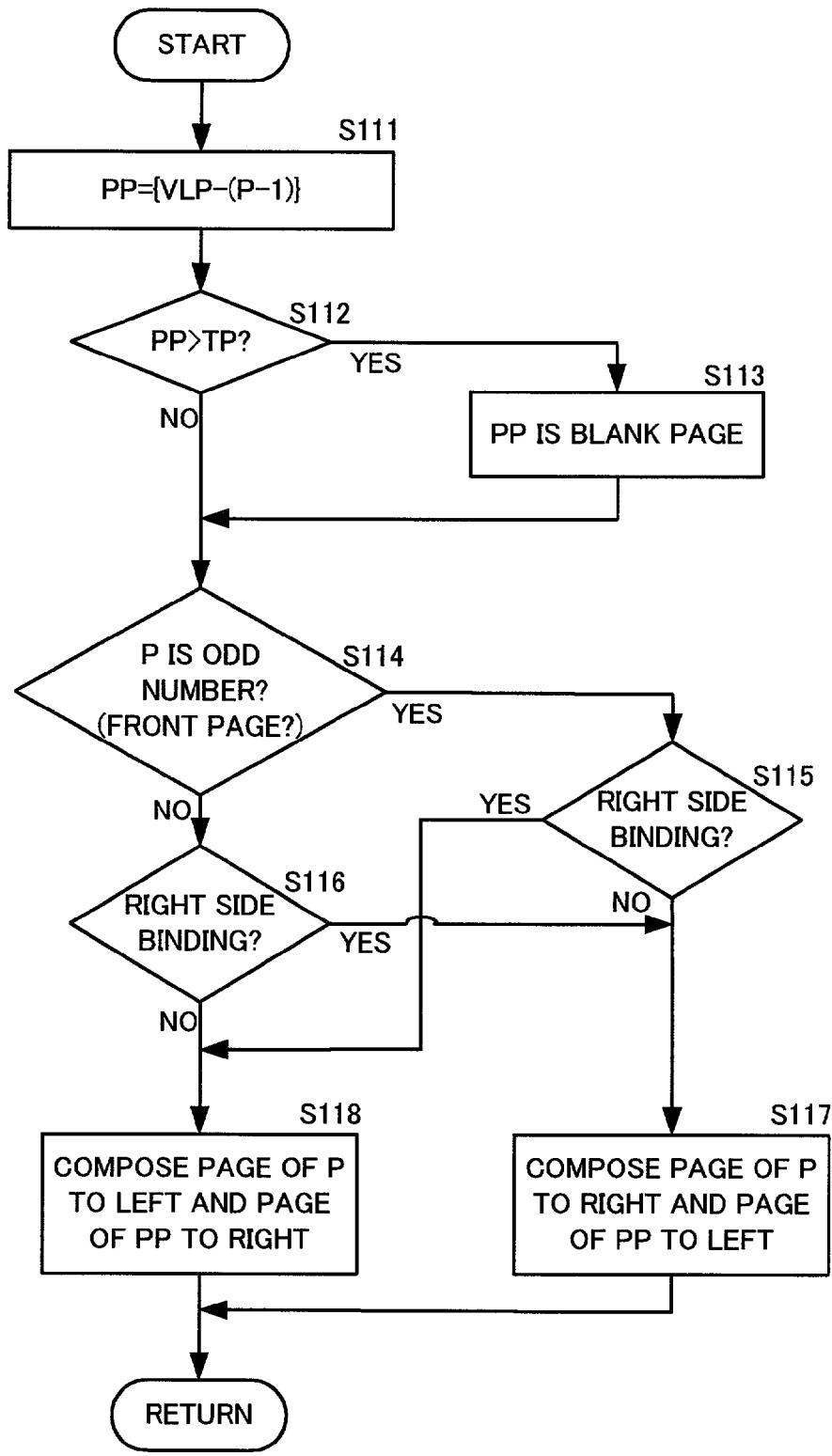
FIG. 8 is a flow chart showing an example of the booklet page composing processing.

FIG. 8 is a flow chart showing an example of the booklet composing processing. This processing is the processing called in S102 and S105 during the booklet transmission processing shown in FIG. 7, and is the processing for composing the image of two pages which are to be recorded by being placed side by side on the front side or the back side of the recording paper. First in S111, the value of the variable PP is calculated which shows the page to be composed and placed side by side with the page shown with the variable P. The page to be composed by being placed side by side with the page shown with the variable P can be calculated by subtracting the value of the variable P minus 1 from the virtual last page (the value of the variable VLP).

In S112, it is judged whether or not the page shown with the variable PP is larger than the total page number TP. As in the manner stated above, according to the value of the total page number TP, there are cases in which it is necessary to insert the blank page thereafter. When the page shown with the variable PP is larger than the total page number TP, in S113, the page shown with the variable PP is assumed to be the blank page.

In S114, it is judged whether or not the value of the variable P is an odd number. When the value of the variable P is an odd number, it shows that the image to be recorded on the front side of the recording paper is to be composed. When the value of the variable P is an even number, it shows that the image to be recorded on the back side of the recording paper is to be composed. When the value of the variable P is an odd number, in S115, it is judged further whether or not it is the setting for the right side binding, and when it is not the setting for the right side binding, in S117, the composed image is to be formed with the image of the page shown with the variable P on the right side, and the image of the page shown with the variable PP on the left side respectively. Moreover, when it is set for the right side binding, in S118, the composed image is to be formed with the image of the page shown with the variable P on the left side, and the image of the page shown with the variable PP on the right side.

Furthermore, in S114, when the value of the variable P is an even number, the position of the pages on the left and the right are to be reversed as to the front side. Therefore, in S116, it is judged whether or not it is the setting for the right side binding, and when it is not the setting for the right side binding, in S118, the composed image is to be formed with the image of the page shown with the variable P on the lest side and the image of the page shown with the variable PP on the right side. Moreover, when it is the setting for the right side binding, in S117, the composed image is to be formed with the image of the page shown with the variable P at the right side and the image of the page shown with the variable PP at the left side.

As in the manner stated above, the page composing processing can be carried out for the recording and output of the booklet.

Figure 9:
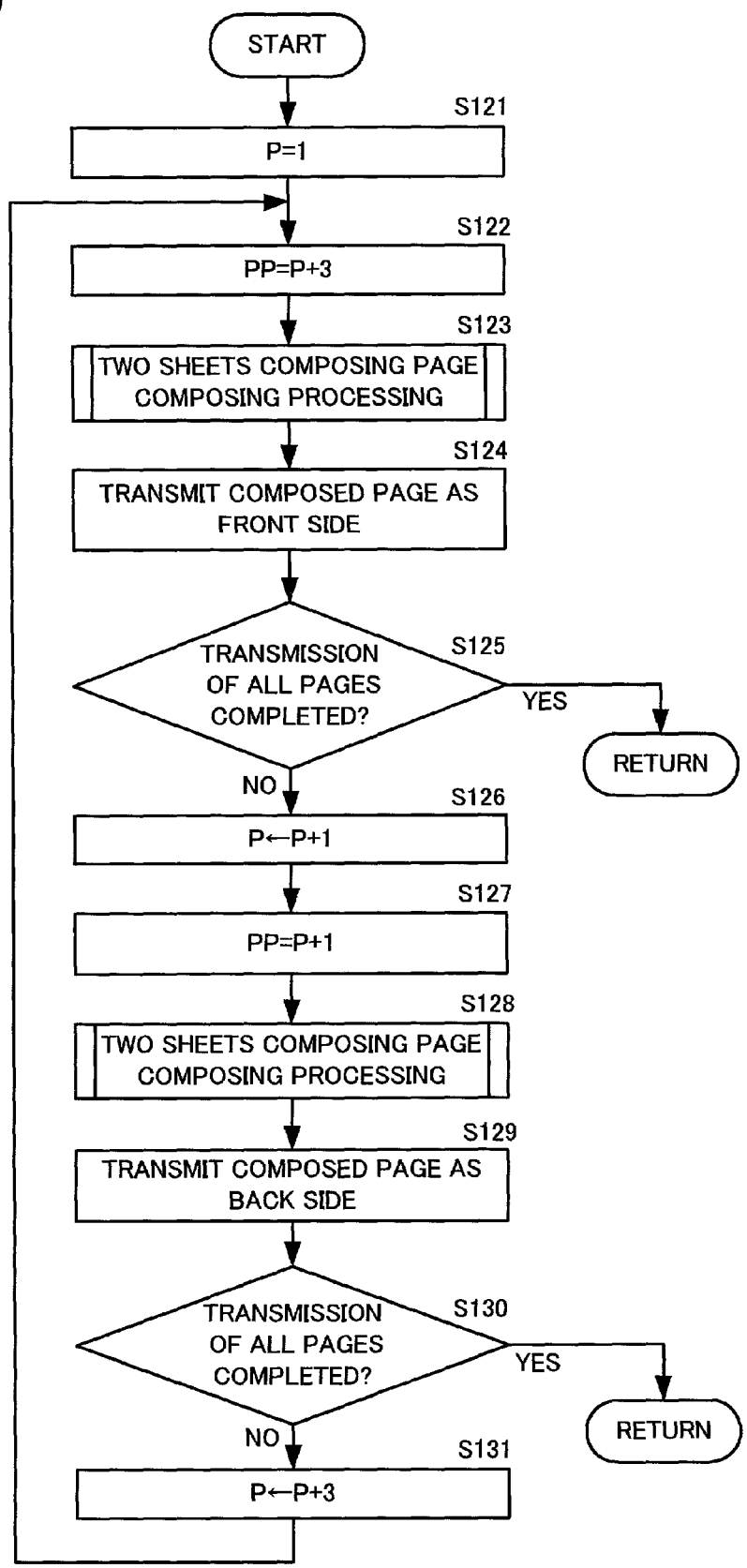
FIG. 9 is a flow chart showing an example of two sheets composing transmission processing.

FIG. 9 is a flow chart showing an example of the two sheets composing transmission processing. The processing shown in FIG. 9 is a processing carried out in S63 shown in FIG. 4. First in S121, the variable P showing the transmitting page is initialized to 1. In S122, the variable PP which shows the page to be composed is set to the variable P+3, and in S123, the two sheets composing page composing processing is carried out. Further, for the two sheets composing page composing processing, the processing after S112 of the booklet page composing processing shown in FIG. 8 is to be carried out. Then, the composed image is transmitted in S124 as the front side image.

In S125, it is judged whether or not the transmission of all pages have been completed, and when the transmission of all pages are not completed, in S126, 1 is added to the variable P and the transmitting page is preceded to the next page. Then in S127, the variable P+1 is set to the variable PP which shows the page to be composed, and in S128, the two sheets composing page composing processing is carried out. Further, also for the two sheets composing page composing processing, the processing after S112 of the booklet page composing processing shown in FIG. 8 is to be carried out. Then, the composed image is transmitted as the image of the back side in S129. As in the manner stated above, with four pages as a unit, the image of the front and the back to be recorded onto one sheet of the recording paper can be transmitted in the same manner with the booklet.

In S130, it is judged whether or not the transmission of all pages has been completed. When the page yet to be transmitted is still remaining, in S131, 3 is added to the variable P, and the processing is continued by returning to S122. When the transmission of all pages is confirmed in S135 or S130, the two sheets composing transmission processing is completed.

Figure 10:
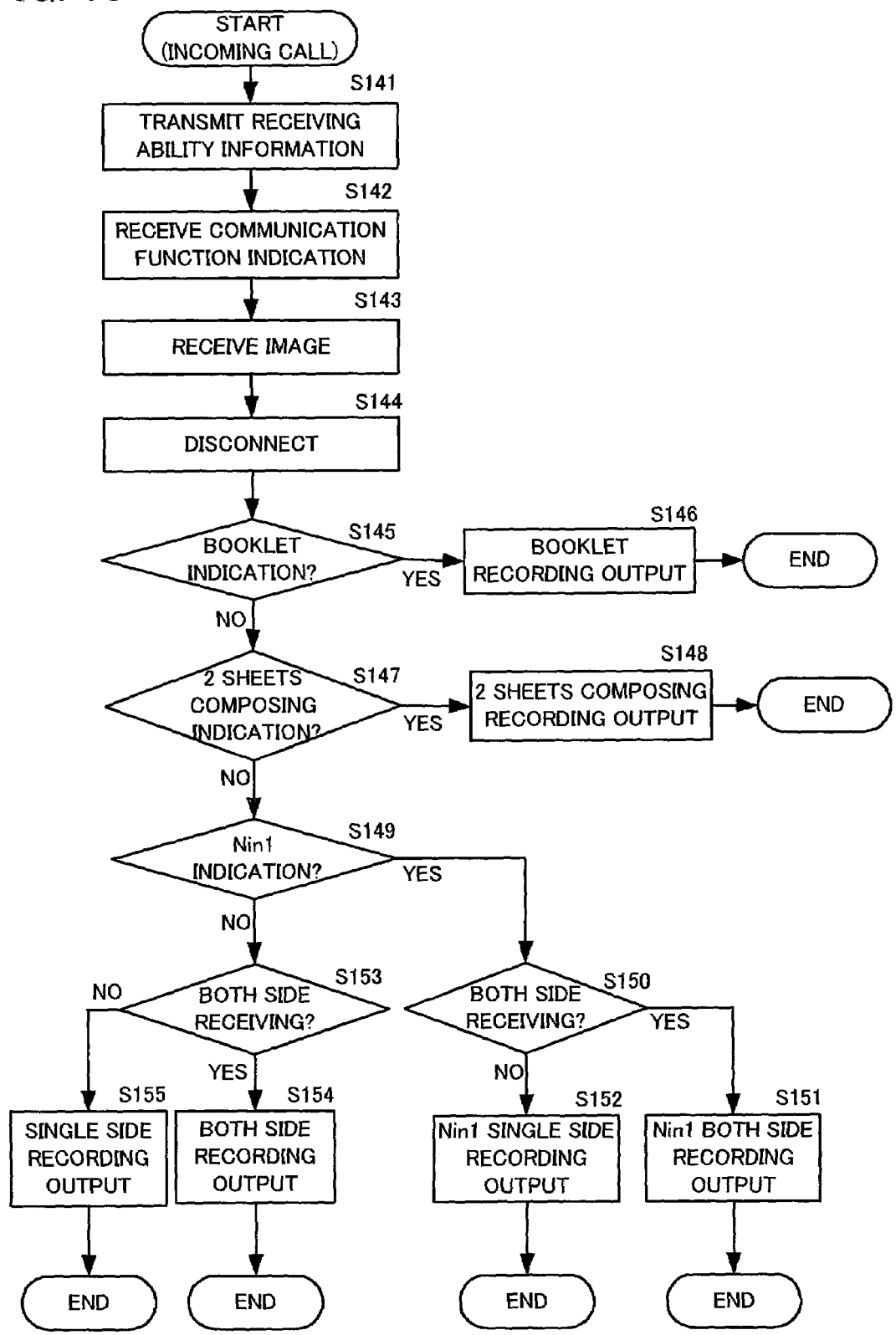
FIG. 10 is a flow chart showing an example of the operation when receiving by the communication terminal device according to an embodiment of the present invention.

The processing when transmitting by the facsimile was explained above. Next, the processing when receiving the facsimile communication from the other end will be described. FIG. 10 is a flow chart showing an example of the operation when receiving by the communication terminal device according to an embodiment of the present invention. When the NCU 17 of the communication unit 16 detects an incoming call from the network, the facsimile communication procedure is carried out and the processing shown in FIG. 10 is started. In S141, the information concerning the receiving ability is transmitted during the facsimile communication procedure. At the time being, in the case it is possible of the booklet receiving or the two sheets composing receiving, an Nin1 receiving, the double side receiving or the like, the fact that these receiving ability is provided is informed to the other end. For example, the receiving ability can be informed to the other end by a DIS signal, a NSF signal or the like.

After transmitting the information concerning the receiving ability, in S142, the indication of the communication function to be set is received from the other end of the transmitting side, also in the facsimile communication procedure. The indication is carried out by DCS signal, NSS signal, or the like. When the other end requests, since the indication of the booklet receiving or the two sheets composing receiving, an Nin1 receiving, the double side receiving or the like are being carried out, the setting is carried out by following these indications. Then in S143, the image is received. It is assumed that that the memory receiving is to be carried out, and the image of all pages are received and accumulated in the image memory 19, and after the receiving is completed, the image is recorded and output from the recording unit 14. Moreover, each time the receiving of one page is completed, considering various functions, when the image is recordable, the image can be recorded.

When the receiving is completed, in S144, the network is disconnected and the processing is carried out for recording and output the received image by the recording unit 14. In S145, it is judged whether or not the booklet receiving is indicated, and when the booklet receiving is indicated, in S146, the composing processing is carried out to the received image at the receiving side so that the booklet is formed as shown in FIG. 2(G), and the image is recorded on both sides of the recording paper by the recording unit 14. The processing at the time being is almost the same as the processing shown in FIG. 7, FIG. 8, and instead of the transmission, the recording and output by the recording unit 14 can be carried out.

Moreover, in S147, it is judged whether or not the two sheets composing receiving is indicated, and when the two sheets composing receiving is indicated, in S148, the composing processing is carried out to the received image at the receiving side so that the booklet is formed per four pages as shown in FIG. 2(H), and the image is recorded on both sides of the recording paper by the recording unit 14. The processing at the time being is almost the same as the processing shown in FIG. 9 (and FIG. 8), and instead of the transmission, the recording and output by the recording unit 14 can be carried out.

Further in S149, it is judged whether or not Nin1 receiving indicated. When Nin1 receiving is indicated, further in S110, it is judged whether or not the double side receiving is indicated. When the double side receiving is indicated, in S151, an Nin1 composing processing is carried out at the receiving side, and the double side recording is carried out by the recording unit 14. Moreover, when the double side receiving is not indicated, in S152, an Nin1 composing processing is carried out at the receiving side, and the single side recording is to be carried out by the recording unit 14. In either case, for example, for 2in1 composing processing, the processing of S85 through S93 shown in FIG. 6 are to be carried out, and instead of the transmission, the double side recording or the single side recording can be carried out by the recording unit 14.

When Nin1 receiving is not indicated in S149, it is the normal double side or single side communication. In S153, it is judged whether or not the double side receiving is indicated, and when the double side receiving is indicated, in S154, the double side recording is carried out by the recording unit 14, and when the double side receiving is not indicated, in S155, the single side recording is to be carried out by the recording unit 14. Further, when receiving the image transmitted by the booklet transmission processing in S57, by two sheets composing transmission processing in S63, or by an Nin1-double side transmission processing in S68, which are shown in FIG. 4, and FIG. 5 for example, in S154, the double side recording is to be carried out. Moreover, for example, when receiving the image transmitted by 2in1 single side transmission processing in S58, by an Nin1 single side transmission processing inS71, which are shown in FIG. 4 and FIG. 5, in S155, the single side recording is to be carried out.

Further, the operation during the receiving in the manner stated above was explained wherein the recording unit 14 is provided in the communication terminal device and the recording and output is carried out by the recording unit 14. However, the present invention is not limited to such case and for example, when the outside printer is capable of being used via the PC interface 15, various recording and output can be carried out in the manner stated above by using the outside printer.

Moreover, the communication terminal device is not required to be provided with both the transmitting function and the receiving function, and for example, the communication terminal device can be provided only with the transmitting function, and for the receiving function, it is not required to be provided with the receiving ability of the booklet or Nin1. For example, when the recording unit 14 is capable of only the single side recording, even if the double side transmission including the booklet or Nin1 are practicable as the transmission function, there are cases in which the booklet or the double side receiving cannot be carried out as the receiving ability. Moreover, contrary stating, the communication terminal device can be provided with these receiving functions and not provided with the transmitting function.

The present invention provides a communication terminal device capable of carrying out the facsimile communication by indicating function such as Nin1 or the booklet. The main control unit 11 carries out the communication by the facsimile communication procedure with the other end via the communication unit 16 and transmits and receives the image. In the case of Nin1 transmission or the booklet transmission, according to the receiving ability received from the other end, when the other end is capable of Nin1 receiving or the booklet receiving, these functions are indicated, and the image of each pages is transmitted. Then, the processing indicated to the received image, such as Nin1, the booklet or the like are carried out and the recording and output is carried out at the other end. When the other end is not provided with these abilities, when transmitting, the composing processing for Nin1 or the booklet is carried out and then the image is transmitted. When receiving, the ability of Nin1 receiving or the booklet receiving is notified, and when these functions are indicated, the indicated processing such as Nin1, the booklet or the like are carried out to the received image and the image is recorded and output by the recording unit 14.

As it is evident from abovementioned explanation, according to the present invention, unlike the conventional technology, it becomes unnecessary of the complicated operation wherein the transmission is carried out with the recording paper, which carried out copying to Nin1 or the booklet once, as the document. As a result, the Nin1 transmission or the booklet transmission can be carried out easily. Moreover, according to the ability of the other end, the image processing to the booklet or Nin1 can be carried out at the transmitting side or at the receiving side. When these receiving processing are capable of being carried out at the receiving side, it is indicated to carry out the image processing such as the booklet or Nin1 at the receiving side. As a result, there is an effect in that the deterioration of the image can be reduced.

What is claimed is:

1. A communication terminal device comprising:
   a communicating means for communicating with a receiving device to determine attribute format capabilities for transmission and to establish a facsimile communication with the receiving device; and
   a control means for controlling the transmission of image data in the determined attribute format to be output by the receiving device in the determined attribute format,
   wherein the attribute format for transmission is selected from the group consisting of Nin1 format transmission, where N is any positive integer, double-sided format transmission and booklet format transmission,
   wherein the double sided format for transmission is selected as the determined attribute format for transmission when the booklet format for transmission is unavailable.

2. The communication terminal device according to claim 1, wherein the communicating means determines attribute format capabilities for transmission of the receiving device during a communication protocol based on a signal selected from the group consisting of Digital Identification Signal (DIS) and Nonstandard Facilities (NSF).

3. The communication terminal device according to claim 1, wherein the receiving device indicates an attribute format capability for transmission during a communication protocol using a signal selected from the group consisting of Digital Transmit Command (DTC) and Nonstandard Facilities Command (NSC).

4. The communication terminal device according to claim 1, wherein the control means controls the transmission of image data in the double sided format such that it is output by the receiving device in the booklet format.

5. The communication terminal device according to claim 1 further comprising a scanner to input the image data.

6. The communication terminal device according to claim 1 further comprising a P.C. interface to receive the image data.

7. The communication terminal device according to claim 1 further comprising a memory to store the image data.

8. The communication terminal device according to claim 1, wherein the communicating means confirms an attribute format for reception to a transmitting device and the control means controls received image data transmitted in the confirmed attribute format for reception and outputs the image data in the confirmed attribute format.

9. The communication terminal device according to claim 8 further comprising a recording device to output the image data in the confirmed attribute format.

10. The communication terminal device according to claim 8 further comprising a display device.

11. A communication terminal device comprising:
    a communicating unit communicating with a receiving device to determine attribute format capabilities for transmission and to establish a facsimile communication with the receiving device; and
    a control unit controlling the transmission of image data in the determined attribute format to be output by the receiving device in the determined attribute format,
    wherein the attribute format for transmission is selected from the group consisting of Nin1 format transmission, where N is any positive integer, double-sided format transmission and booklet format transmission,
    wherein the double sided format for transmission is selected as the determined attribute format for transmission when the booklet format for transmission is unavailable.

12. A method for communicating comprising:
    inputting image data;
    designating an attribute format for transmission;
    establishing a communication with a receiving device;
    determining attribute format capabilities for transmission of the receiving device;
    transmitting the image data in the designated attribute format for transmission to the receiving device to be output by the receiving device in the designated attribute format, wherein the attribute format for transmission is selected from the group consisting of Nin1 format transmission, where N is any positive integer and booklet format transmission; and
    selecting a double sided format for transmission as the designated attribute format for transmission when the booklet format for transmission is unavailable.

13. The method according to claim 12 further comprising determining attribute format capabilities for transmission of the receiving device during a communication protocol based on a signal selected from the group consisting of Digital Identification Signal (DIS) and Nonstandard Facilities (NSF).

14. The method according to claim 12 further comprising receiving from the receiving device an attribute format capability for transmission during a communication protocol using a signal selected from the group consisting of Digital Transmit Command (DTC) and Nonstandard Facilities Command (NSC).

15. The method according to claim 12 further comprising controlling the transmission of image data in the double sided format such that it is output by the receiving device in the booklet format.

16. The method according to claim 12 further comprising:
    confirming an attribute format for reception to a transmitting device;
    controlling received information transmitted in the confirmed attribute format for reception; and
    outputting the information in the confirmed attribute format.

* * * * *